United States Patent
Takayama

(10) Patent No.: US 10,245,958 B2
(45) Date of Patent: Apr. 2, 2019

(54) HYBRID VEHICLE AND CONTROL METHOD THEREFOR

(71) Applicant: TOYOTA JIDOSHA KABUSHIKI KAISHA, Toyota-shi, Aichi-ken (JP)

(72) Inventor: Daiki Takayama, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/922,319

(22) Filed: Mar. 15, 2018

(65) Prior Publication Data
US 2018/0264952 A1   Sep. 20, 2018

(30) Foreign Application Priority Data
Mar. 17, 2017 (JP) ................ 2017-052606

(51) Int. Cl.
| | | |
|---|---|---|
| B60L 11/14 | (2006.01) | |
| B60W 10/06 | (2006.01) | |
| B60W 10/08 | (2006.01) | |
| B60L 15/00 | (2006.01) | |
| B60L 3/00 | (2019.01) | |
| B60K 6/445 | (2007.10) | |
| B60W 20/15 | (2016.01) | |

(52) U.S. Cl.
CPC ............. *B60L 11/14* (2013.01); *B60K 6/445* (2013.01); *B60L 3/003* (2013.01); *B60L 3/0046* (2013.01); *B60L 15/007* (2013.01); *B60W 10/06* (2013.01); *B60W 10/08* (2013.01); *B60W 20/15* (2016.01); *B60L 2210/42* (2013.01); *B60L 2220/14* (2013.01); *B60L 2240/423* (2013.01); *B60L 2240/547* (2013.01); *B60L 2240/549* (2013.01)

(58) Field of Classification Search
CPC ........ B60L 11/14; B60L 3/003; B60L 3/0046; B60L 15/007; B60L 2210/42; B60L 2220/14; B60L 2240/423; B60L 2240/547; B60L 2240/549; B60W 20/15; B60W 10/06; B60W 10/08
USPC ...................................................... 180/65.28
See application file for complete search history.

(56) References Cited

U.S. PATENT DOCUMENTS

| | | | |
|---|---|---|---|
| 2014/0244082 A1* | 8/2014 | Caron | B60L 11/005 701/22 |
| 2018/0178774 A1* | 6/2018 | Katsumata | B60W 20/10 |

FOREIGN PATENT DOCUMENTS

JP    2013-203116 A    10/2013

* cited by examiner

*Primary Examiner* — John D Walters
(74) *Attorney, Agent, or Firm* — Sughrue Mion, PLLC

(57) ABSTRACT

An engine and a step up-down converter are controlled such that a counter-electromotive voltage of a first motor becomes higher than direct current-side voltages of a first inverter and a second inverter and thereby torque for forward travel is output from the first motor to a driving shaft through a planetary gear set, when an accelerator is on during specified travelling with gates of the first inverter and the second inverter being cut off and the engine being operated. The engine and the step up-down converter are controlled such that the rotational speed of the first motor becomes smaller and the voltage of the high voltage-side electric power line becomes lower when the accelerator is off than when the accelerator is on during the specified traveling.

7 Claims, 7 Drawing Sheets

HYBRID VEHICLE AND CONTROL METHOD THEREFOR

CROSS-REFERENCE TO RELATED APPLICATIONS

The disclosure of Japanese Patent Application No. 2017-052606 filed on Mar. 17, 2017 including the specification, drawings and abstract is incorporated herein by reference in its entirety.

BACKGROUND

1. Technical Field

The present disclosure relates to a hybrid vehicle and a control method therefor.

2. Description of Related Art

As a hybrid vehicle of this type, there has been proposed a vehicle including an engine, a first motor, and a planetary gear mechanism including a carrier, a sun gear, and a ring gear that are connected to the engine, the first motor, and an output member coupled with driving wheels. The hybrid vehicle also includes a second motor connected to the output member, an inverter that drives the first motor and the second motor, and a battery connected to the inverter through an electric power line (see, for example, Japanese Patent Application Publication No. 2013-203116). When an accelerator is on while the hybrid vehicle travels with a gate of the inverter being cut off and the engine being operated, the hybrid vehicle controls the engine based on a direct current-side voltage of the inverter, rotational speed of the output member, and an accelerator operation amount so that a counter-electromotive voltage generated with rotation of the first motor becomes higher than the direct current-side voltage of the inverter. With such control, the hybrid vehicle regulates braking torque based on the counter-electromotive voltage of the first motor, and regulates counterforce torque of the braking torque (driving torque generated in the output member).

SUMMARY

An issue of the hybrid vehicle is how to cause driving torque of the output member, when the accelerator is off while the hybrid vehicle travels with the gates of the inverters being cut off and the engine being operated, to be sufficiently lower than the driving torque when the accelerator is on.

Accordingly, the present disclosure provides a hybrid vehicle and a control method therefor that cause torque of a driving shaft, when an accelerator is off while the hybrid vehicle travels with gates of inverters being cut off and an engine being operated, to be sufficiently lower than the torque when the accelerator is on.

According to one aspect of the present disclosure, there is provided a hybrid vehicle including an engine, a first motor, a second motor, a planetary gear set, a first inverter, a second inverter, an electric storage device, a step up-down converter and an electronic control unit. The first motor is configured to generate a counter-electromotive voltage with rotation of the first motor. The second motor is connected to a driving shaft coupled with driving wheels of the hybrid vehicle, the second motor being configured to generate a counter-electromotive voltage with rotation of the second motor. The planetary gear set includes three rotation elements connected to three shafts, the shafts including a shaft of the first motor, a shaft of the engine, and the driving shaft, the three rotation elements being connected such that the first motor, the engine, and the driving shaft are arrayed in the order of the first motor, the engine, and the driving shaft in an alignment chart. The first inverter is configured to drive the first motor. The second inverter is configured to drive the second motor. The step up-down converter is connected to a low voltage-side electric power line and a high voltage-side electric power line. The low voltage-side electric power line is connected to the electric storage device. The high voltage-side electric power line is connected to the first inverter and the second inverter. The step up-down converter is configured to transfer electric power between the low voltage-side electric power line and the high voltage-side electric power line while changing voltage of the electric power. The electronic control unit is configured to: (i) control the engine and the step up-down converter such that the counter-electromotive voltage of the first motor becomes higher than a direct current-side voltage of the first inverter and a direct current-side voltage of the second inverter and that torque is output from the first motor to the driving shaft through the planetary gear set, when an accelerator is on during specified traveling of the hybrid vehicle with gates of the first inverter and the second inverter being cut off and the engine being operated, and (ii) control the engine and the step up-down converter such that rotational speed of the first motor becomes smaller and voltage of the high voltage-side electric power line becomes lower when the accelerator is off than when the accelerator is on during the specified traveling.

The hybrid vehicle of the present disclosure controls the engine and the step up-down converter such that the counter-electromotive voltage of the first motor becomes higher than direct current-side voltages of the first inverter and the second inverter and that torque is output from the first motor to the driving shaft through the planetary gear set, when an accelerator is on during specified travelling with gates of the first inverter and the second inverter being cut off and an engine being operated. When the first motor rotates, drag torque (mechanical loss) is generated in the first motor. When the counter-electromotive voltage of the first motor is higher than the direct current-side voltage of the first inverter, regeneration torque based on the counter-electromotive voltage is also generated in addition to the drag torque in the first motor. Therefore, the hybrid vehicle can travel with the driving torque of the driving shaft based on the regeneration torque and the drag torque in the first motor, when the counter-electromotive voltage of the first motor is made higher than the direct current-side voltage of the first inverter. When the second motor rotates, drag torque (mechanical loss) is generated in the second motor. When the counter-electromotive voltage of the second motor is higher than the direct current-side voltage of the second inverter, regeneration torque based on the counter-electromotive voltage is also generated in addition to the drag torque in the second motor. The generated torque is output to the driving shaft as braking torque. The engine and the step up-down converter are controlled such that the rotational speed of the first motor becomes smaller and the voltage of the high voltage-side electric power line becomes lower when the accelerator is off than when the accelerator is on during the specified traveling. When the rotational speed of the first motor is made smaller, the regeneration torque and the drag torque in the first motor can be made smaller. As a result, torque (driving torque) of the driving shaft based on the regeneration torque and the drag torque can be reduced. When the voltage of the high voltage-side electric power line is made lower, the regeneration torque can be generated and increased in the second motor, while the torque of the driving shaft can be decreased (can be increased as braking torque). As a result, as compared with the case where the rotational speed of the first motor is simply reduced, the total torque of the driving shaft can sufficiently be reduced (can be increased as braking torque). As a result, a sufficient braking force of the hybrid vehicle can be secured.

In the hybrid vehicle, the electronic control unit may be configured to: (i) set a target voltage of the high voltage-side electric power line such that a total torque of the driving shaft is maximized as braking torque when the accelerator is off during the specified traveling, and (ii) control the step up-down converter such that the voltage of the high voltage-side electric power line becomes the target voltage. Such a hybrid vehicle can maximize the total torque of the driving shaft as braking torque. As a result, a more sufficient braking force of the hybrid vehicle can be secured.

In the hybrid vehicle, the electronic control unit may be configured to: (i) control the step up-down converter such that the voltage of the high voltage-side electric power line becomes lower than the voltage when the accelerator is on, when the accelerator is off during the specified traveling and when vehicle speed is in a specified range, and (ii) control the step up-down converter such that the voltage of the high voltage-side electric power line becomes identical to the voltage when the accelerator is on, when the vehicle speed is out of the specified range. Such a hybrid vehicle can select whether or not to cause the voltage of the high voltage-side electric power line to be lower than the voltage when the accelerator is on, in accordance with the vehicle speed. Here, a lower limit of "specified range" may be a threshold (limit) used for determining whether or not the hybrid vehicle is requested to secure a braking force large to a certain extent (i.e., a braking force of a specified magnitude). An upper limit of "specified range" may be a threshold (limit) used for determining whether or not there is a possibility that a large current (i.e., electric current equal to or above a specified value) flows to the second inverter, the step up-down converter, or the battery when the voltage of the high voltage-side electric power line is made lower than the voltage when the accelerator is on.

In the hybrid vehicle of the present disclosure, the electronic control unit may control the engine such that the engine rotates at an allowable lower limit rotational speed when the accelerator is off during the specified traveling. Such a hybrid vehicle can sufficiently reduce the torque output from the first motor to the driving shaft through the planetary gear set as driving torque, or sufficiently increase the output torque as braking torque.

According to another aspect of the present disclosure, there is provided a control method for a hybrid vehicle, the hybrid vehicle including an engine, a first motor, a second motor, a planetary gear set, a first inverter, a second inverter, an electric storage device, and a step up-down converter. The first motor is configured to generate a counter-electromotive voltage with rotation of the first motor. The second motor is connected to a driving shaft coupled with driving wheels of the hybrid vehicle, the second motor being configured to generate a counter-electromotive voltage with rotation of the second motor. The planetary gear set includes three rotation elements connected to three shafts, the shafts including a shaft of the first motor, a shaft of the engine, and the driving shaft, the three rotation elements being connected such that the first motor, the engine, and the driving shaft are arrayed in the order of the first motor, the engine, and the driving shaft in an alignment chart. The first inverter is configured to drive the first motor. The second inverter is configured to drive the second motor. The step up-down converter is connected to a low voltage-side electric power line and a high voltage-side electric power line. The low voltage-side electric power line is connected to the electric storage device. The high voltage-side electric power line is connected to the first inverter and the second inverter. The step up-down converter is configured to transfer electric power between the low voltage-side electric power line and the high voltage-side electric power line while changing voltage of the electric power. The control method is configured as below. That is, the control method includes (i) controlling the engine and the step up-down converter such that the counter-electromotive voltage of the first motor becomes higher than a direct current-side voltage of the second inverter and a direct current-side voltage of the second inverter and that torque is output from the first motor outputs to the driving shaft through the planetary gear set, when an accelerator is on during specified traveling of the hybrid vehicle with gates of the first inverter and the second inverter being cut off and the engine being operated. The control method also includes (ii) controlling the engine and the step up-down converter such that rotational speed of the first motor becomes smaller and voltage of the high voltage-side electric power line becomes lower when the accelerator is off than when the accelerator is on during the specified traveling.

According to the control method for the hybrid vehicle as described in the foregoing, the hybrid vehicle can travel with the driving torque of the driving shaft based on regeneration torque and drag torque in the first motor, when the counter-electromotive voltage of the first motor is made higher than the direct current-side voltage of the first inverter. When the second motor rotates, drag torque (mechanical loss) is generated in the second motor. When the counter-electromotive voltage of the second motor is higher than the direct current-side voltage of the second inverter, regeneration torque based on the counter-electromotive voltage is also generated in addition to the drag torque in the second motor. The generated torque is output to the driving shaft as braking torque. The engine and the step up-down converter are controlled such that the rotational speed of the first motor becomes smaller and the voltage of the high voltage-side electric power line becomes lower when the accelerator is off than when the accelerator is on during the specified traveling. When the rotational speed of the first motor is made smaller, the regeneration torque and the drag torque in the first motor can be made smaller. As a result, the torque (driving torque) of the driving shaft based on the regeneration torque and the drag torque can be reduced. When the voltage of the high voltage-side electric power line is made lower, the regeneration torque can be generated and increased in the second motor, while the torque of the driving shaft can be reduced (can be increased as braking torque). As a result, as compared with the case where the rotational speed of the first motor is simply reduced, the total torque of the driving shaft can sufficiently be reduced (can be increased as braking torque). As a result, a sufficient braking force of the hybrid vehicle can be secured.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Now, modes for carrying out the present disclosure will be described in detail based on embodiments.

Figure 1:
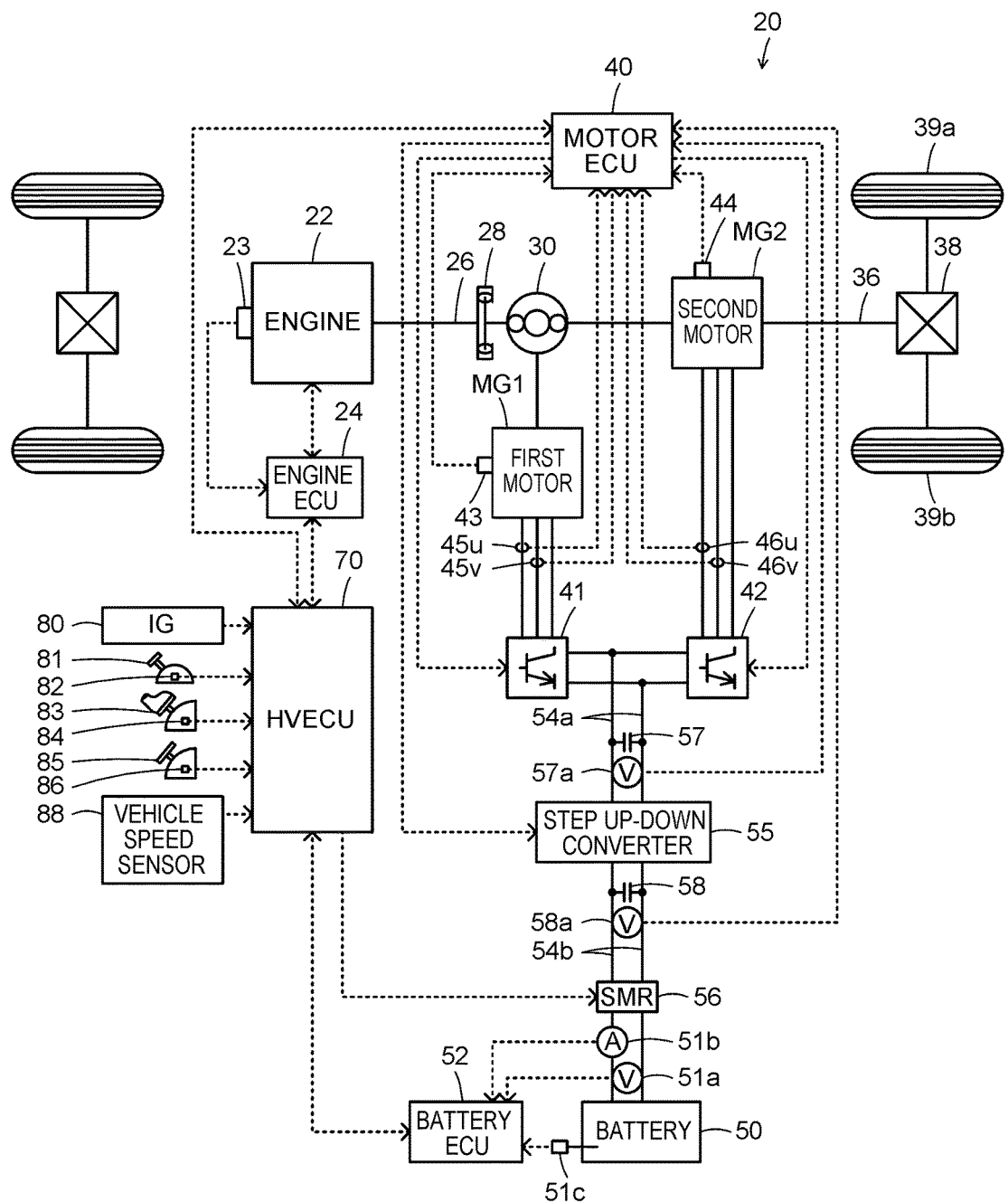
FIG. 1 is a block diagram illustrating an outlined configuration of a hybrid vehicle as one embodiment of the present disclosure.
Figure 2:
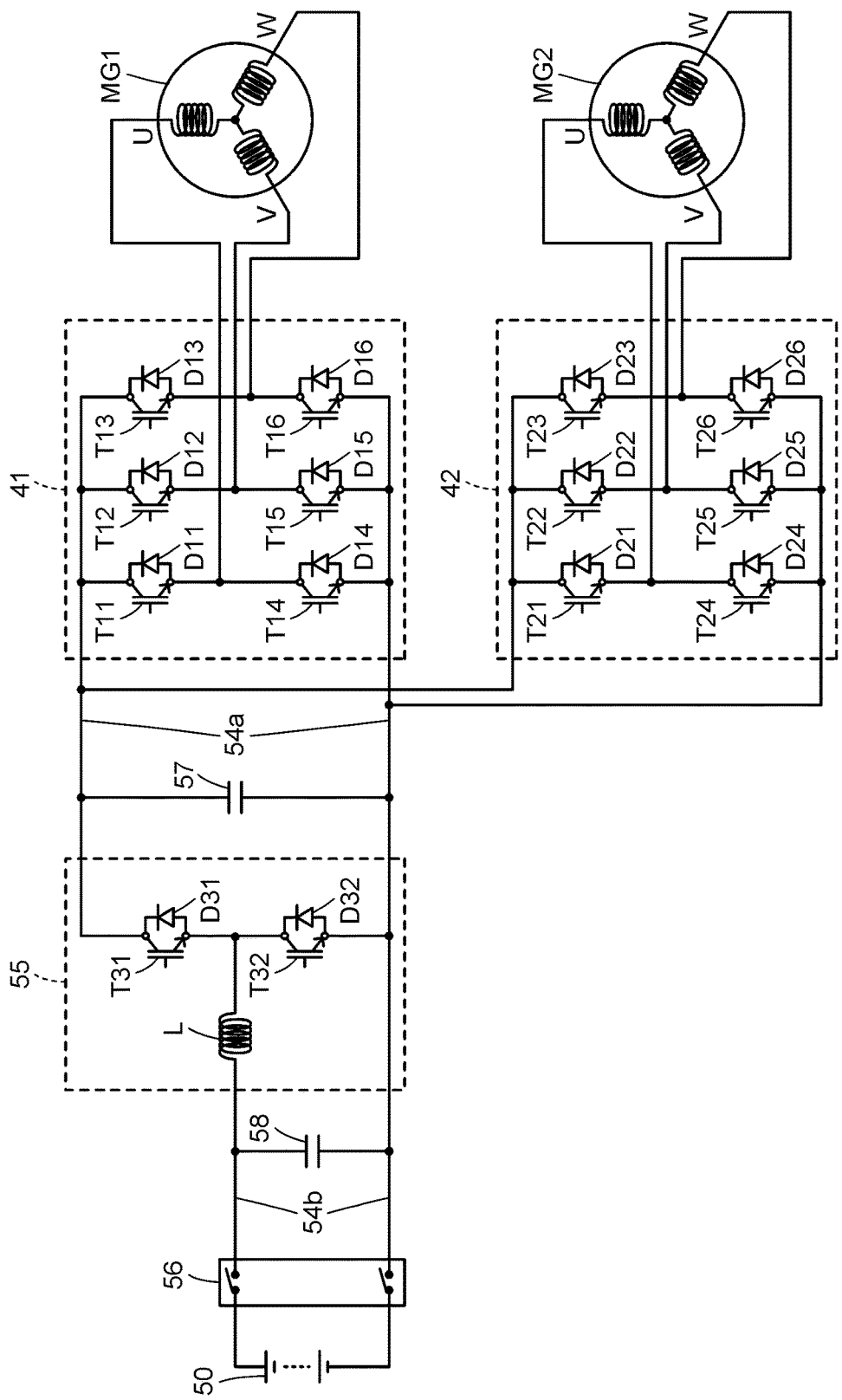
FIG. 2 is a block diagram illustrating an outlined configuration of an electric drive system including a first motor and a second motor illustrated in FIG. 1.

FIG. 1 is a block diagram illustrating an outlined configuration of a hybrid vehicle 20 as one embodiment of the present disclosure. FIG. 2 is a block diagram illustrating an outlined configuration of an electric drive system including a first motor MG1 and a second motor MG2. As illustrated in the drawings, the hybrid vehicle 20 of the embodiment includes an engine 22, a planetary gear set 30, a first motor MG1, a second motor MG2, a first inverter 41, a second inverter 42, a step up-down converter 55, a battery 50 as an electric storage device, a system main relay (also abbreviated to "SMR") 56, and a hybrid electronic control unit (referred to as "HVECU" below) 70.

The engine 22 is configured as an internal combustion engine that outputs motive power by using fuel such as gasoline, and gas oil. The operation of the engine 22 is controlled by an engine electronic control unit (hereinafter referred to as "engine ECU") 24.

Although not illustrated, the engine ECU 24 is configured as a microprocessor having a CPU as a main component. The engine ECU 24 includes, in addition to the CPU, a ROM that stores processing programs, a RAM that temporarily stores data, input and output ports, and a communication port. The engine ECU 24 receives, through the input port, input of signals from various sensors necessary for operation control of the engine 22, the signals including, for example, a crank angle θcr from a crank position sensor 23 that detects a rotational position of a crankshaft 26 of the engine 22. The engine ECU 24 outputs various control signals for operation control of the engine 22 through the output port. The engine ECU 24 is connected with the HVECU 70 through the communication port. The engine ECU 24 calculates a rotational speed Ne of the engine 22 based on the crank angle θcr from the crank position sensor 23.

The planetary gear set 30 is configured as a single pinion-type planetary gear mechanism. The planetary gear set 30 has a sun gear connected to a rotator of the first motor MG1. The planetary gear set 30 has a ring gear connected to a driving shaft 36 coupled with driving wheels 39a, 39b through a differential gear set 38. The planetary gear set 30 has a carrier connected to the crankshaft 26 of the engine 22 through a damper 28.

The first motor MG1 is configured as a synchronous generator-motor including a rotator with a permanent magnet embedded therein and a stator with a three-phase coil wound therearound. As described before, the rotator is connected to the sun gear of the planetary gear set 30. The second motor MG2 is configured as a synchronous generator-motor as in the case of the first motor MG1. The second motor MG2 has a rotator connected to the driving shaft 36.

The first inverter 41 and the second inverter 42 are used for driving the first motor MG1 and the second motor MG2. As illustrated in FIG. 2, the first inverter 41 is connected to a high voltage-side electric power line 54a. The first inverter 41 has six transistors T11 to T16, and six diodes D11 to D16 that are connected in parallel with the six transistors T11 to T16, respectively. The transistors T11 to T16 are disposed in pairs so that their source side and sink side are connected to a positive electrode-side line and a negative electrode-side line of the high voltage-side electric power line 54a, respectively. Junction points between the pairs made from the transistors T11 to T16 are connected to coils of a three-phase coil (U-phase, V-phase, W-phase) of the first motor MG1, respectively. When voltage acts on the first inverter 41, a motor electronic control unit (referred to as motor "ECU" below) regulates a ratio of turn-on time of the pairs of the transistors T21 to T26. As a result, a rotating field is formed in the three-phase coil, so that the first motor MG1 is rotationally driven. Like the first inverter 41, the second inverter 42 is connected to the high voltage-side electric power line 54a. The second inverter 42 also has six transistors T21 to T26 and six diodes D21 to D26. When voltage acts on the second inverter 42, the motor ECU regulates a ratio of turn-on time of the pairs of the transistors T21 to T26. As a result, a rotating field is formed in the three-phase coil, so that the second motor MG2 is rotationally driven.

The step up-down converter 55 is connected to the high voltage-side electric power line 54a and a low voltage-side electric power line 54b. The step up-down converter 55 has two transistors T31, T32, two diodes D31, D32 that are connected in parallel to the transistors T31, T32, and a reactor L. The transistor T31 is connected to the positive electrode-side line of the high voltage-side electric power line 54a. The transistor T32 is connected to the transistor T31, the negative electrode-side line of the high voltage-side electric power line 54a, and a negative electrode-side line of the low voltage-side electric power line 54b. The reactor L is connected to a junction point between the transistor T31 and the transistor T32 and to a positive electrode-side line of the low voltage-side electric power line 54b. As a ratio of turn-on time of the transistors T31, T32 is regulated by the motor ECU 40, the first step up-down converter 55 steps up the voltage of electric power of the low voltage-side electric power line 54b and supplies the electric power to the high voltage-side electric power line 54a, or steps down the voltage of electric power of the high voltage-side electric power line 54a and supplies the electric power to the low voltage-side electric power line 54b. The positive electrode-side line and the negative electrode-side line of the high voltage-side electric power line 54a are equipped with a smoothing capacitor 57. The positive electrode-side line and the negative electrode-side line of the low voltage-side electric power line 54b are equipped with a smoothing capacitor 58.

Although not illustrated, the motor ECU 40 is configured as a microprocessor having a CPU as a main component. The motor ECU 40 includes, in addition to the CPU, a ROM that stores processing programs, a RAM that temporarily stores data, input and output ports, and a communication port. As illustrated in FIG. 1, the motor ECU 40 receives, through the input port, input of signals from various sensors necessary for drive control of the first motor MG1, the second motor MG2, and the step up-down converter 55. Examples of the signals input into the motor ECU 40 may include rotational positions θm1, θm2 from a first rotational position detection sensor 43 and a second rotational position detection sensor 44 that detect rotational positions of the rotators of the first motor MG1 and the second motor MG2, and phase currents Iu1, Iv1, Iu2, Iv2 from current sensors 45u, 45v, 46u, 46v that detect electric current flowing in respective phases of the first motor MG1 and the second motor MG2. The examples of the signals may also include a voltage (high voltage-side voltage) VH of the capacitor 57 (high voltage-side electric power line 54a) from a voltage sensor 57a attached across the terminals of the capacitor 57, and a voltage (low voltage-side voltage) VL of the capacitor 58 (low voltage-side electric power line 54b) from a voltage sensor 58a attached across the terminals of the capacitor 58. The motor ECU 40 outputs, through the output port, various control signals for performing drive control of the first motor MG1, the second motor MG2, and the step up-down converter 55. Examples of the signals output from the motor ECU 40 may include switching control signals to the transistors T11 to T16 of the first inverter 41 and to the transistors T21 to T26 of the second inverter 42, and switching control signals to the transistors T31, T32 of the step up-down converter 55. The motor ECU 40 is connected with the HVECU 70 through the communication port. The motor ECU 40 calculates electrical angles θe1, θe2, angular speeds ωm1, ωm2, and rotational speeds Nm1, Nm2 of the first motor MG1 and the second motor MG2 based on the rotational positions θm1, θm2 of the rotators of the first motor MG1 and the second MG2 from the first rotational position detection sensor 43 and the second rotational position detection sensor 44.

For example, the battery 50 is configured as a lithium-ion secondary battery or a nickel-hydrogen secondary battery. The battery 50 is connected to the low voltage-side electric power line 54b. The battery 50 is managed by a battery electronic control unit (hereinafter referred to as "battery ECU") 52.

Although not illustrated, the battery ECU 52 is configured as a microprocessor having a CPU as a main component. The battery ECU 52 includes, in addition to the CPU, a ROM that stores processing programs, a RAM that temporarily stores data, input and output ports, and a communication port. The battery ECU 52 receives, through the input port, input of signals from various sensors necessary for managing the battery 50. Examples of the signals input into the battery ECU 52 may include a voltage Vb of the battery 50 from a voltage sensor 51a attached across the terminals of the battery 50, an electric current Ib of the battery 50 from a current sensor 51b attached to an output terminal of the battery 50, and a temperature Tb of the battery 50 from a temperature sensor 51c attached to the battery 50. The battery ECU 52 is connected with the HVECU 70 through the communication port. The battery ECU 52 calculates a state of charge SOC based on an integrated value of the electric current Ib of the battery 50 from the current sensor 51b. The state of charge SOC refers to a ratio of capacity of electric power dischargeable from the battery 50 to the total capacity of the battery 50.

The system main relay 56 is provided in a portion of the low voltage-side electric power line 54b closer to the battery 50 side than the capacitor 58. The system main relay 56 connects and disconnects between the battery 50 and the step up-down converter 55 when on-off control of the system main relay 56 is performed by the HVECU 70.

Although not illustrated, the HVECU 70 is configured as a microprocessor having a CPU as a main component. The HVECU 70 includes, in addition to the CPU, a ROM that stores processing programs, a RAM that temporarily stores data, input and output ports, and a communication port. The HVECU 70 receives signals from various sensors through the input port. Examples of the signals input into the HVECU 70 may include an ignition signal from an ignition switch 80, and a shift position SP from a shift position sensor 82 that detects an operative position of a shift lever 81. The examples of the signals may also include an accelerator operation amount Acc from an accelerator pedal position sensor 84 that detects a stepping-in amount of an accelerator pedal 83, a brake pedal position BP from a brake pedal position sensor 86 that detects the stepping-in amount of the brake pedal 85, and a vehicle speed V from a vehicle speed sensor 88. The shift position SP includes a parking position (P position), a reversing position (R position), a neutral position (N position), and a driving position (D position). As described before, the HVECU 70 is connected with the engine ECU 24, the motor ECU 40, and the battery ECU 52 through the communication port.

The thus-configured hybrid vehicle 20 of the embodiment sets a request driving force of the driving shaft 36 based on the accelerator operation amount Acc and the vehicle speed V, and performs operation control of the engine 22, the first motor MG1, and the second motor MG2 such that a request motive power corresponding to the request driving force is output to the driving shaft 36. Operation modes of the engine 22, the first motor MG1, and the second motor MG2 may include modes (1) to (3) stated below. Both (1) torque conversion operation mode and (2) charging and discharging operation mode are the modes for controlling the engine 22, the first motor MG1, and the second motor MG2 such that the request motive power is output to the driving shaft 36 with operation of the engine 22. Since there is no substantial difference in control between the mode (1) and the mode (2), they are collectively referred to as an engine operation mode. (1) Torque conversion operation mode: a mode for performing operation control of the engine 22 such that the motive power corresponding to the request motive power is output from the engine 22 and for performing drive control of the first motor MG1 and the motor MG2 such that all the motive power output from the engine 22 is converted to torque by the planetary gear set 30, the first motor MG1, and the second motor MG2 and that the request motive power is output to the driving shaft 36. (2) Charging and discharging operation mode: a mode for performing operation control of the engine 22 such that the motive power corresponding to a sum of the request motive power and electric power necessary for charging and discharging of the battery 50 is output from the engine 22, and for performing drive control of the first motor MG1 and the second motor MG2 such that all or some of the motive power output from the engine 22 is converted to torque by the planetary gear set 30, the first motor MG1, and the second motor MG2 while charge and discharge of the battery 50 is conducted, and that the request motive power is output to the driving shaft 36. (3) Motor operation mode: a mode for performing drive control of the second motor MG2 such that operation of the engine 22 is stopped and the request motive power is output to the driving shaft 36.

The hybrid vehicle 20 of the embodiment performs inverter-less travel (limp home operation) with the gates of the first inverter 41 and the second inverter 42 being cut off (all the transistors T11 to T16, T21 to T26 being turned off) and the engine 22 being operated, when abnormality occurs in the first inverter 41 and the second inverter 42, or in the sensors (such as the first rotational position detection sensor 43, and the second rotational position detection sensor 44) used for control of the first inverter 41 and the second inverter 42 during operation (rotation) of the engine 22.

When the accelerator is on in inverter-less traveling, the HVECU 70 sets a specified rotational speed Nm1 set as a target rotational speed Nm1* of the first motor MG1, and also sets a target voltage VH* of the high voltage-side electric power line 54a, so that a counter-electromotive voltage Vcef1 generated with rotation of the first motor MG1 becomes higher than the voltage VH of the high voltage-side electric power line 54a. Here, the counter-electromotive voltage Vcef1 of the first motor MG1 corresponds to a product of an angular speed ωm1 and a counter-electromotive voltage constant Km1 of the first motor MG1. As the specified rotational speed Nm1 set, values such as 4000 rpm, 5000 rpm, and 6000 rpm may be used, for example. As the specified voltage VHset, values such as 330 V, 350 V, and 370 V may be used, for example.

Figure 3:
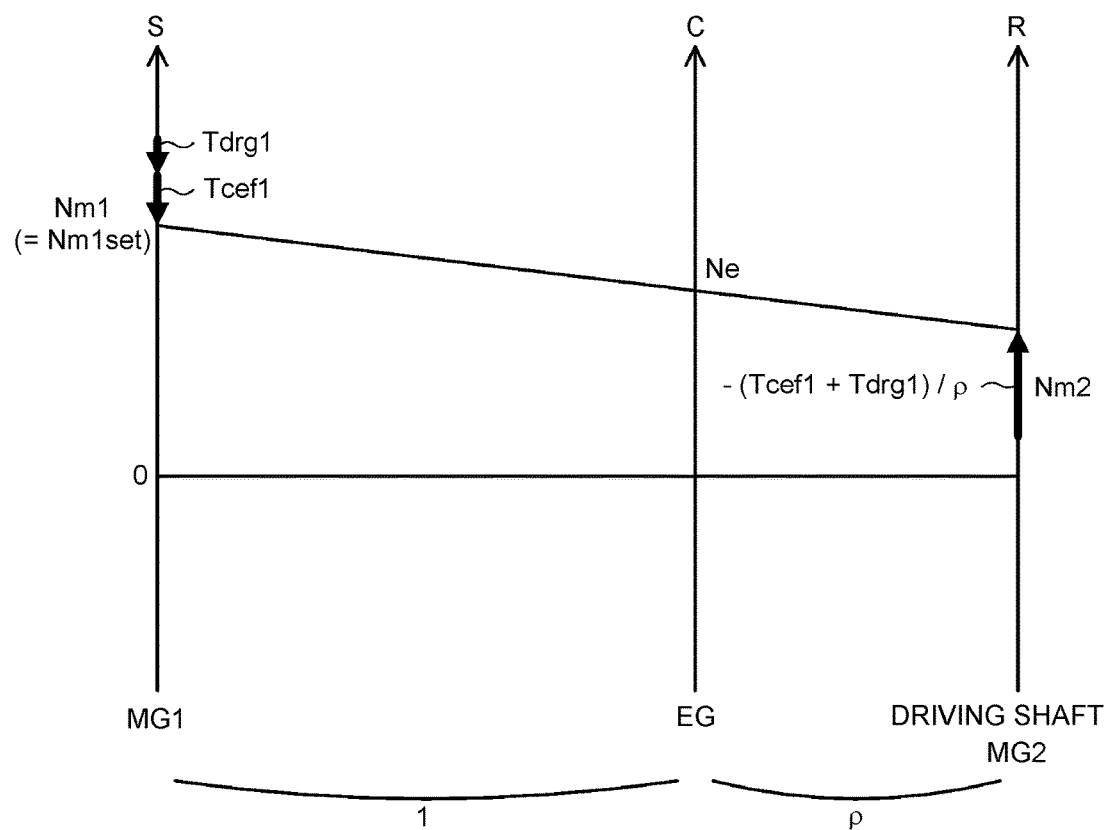
FIG. 3 is an explanatory view illustrating one example of an alignment chart of a planetary gear set when a counter-electromotive voltage of the first motor is higher than a voltage of a high voltage-side electric power line while the gates of a first inverter and a second inverter illustrated in FIG. 1 are cut off.

FIG. 3 is an explanatory view illustrating one example of an alignment chart of the planetary gear set 30 when the counter-electromotive voltage Vcef1 of the first motor MG1 is higher than the voltage VH of the high voltage-side electric power line 54a while the gates of the first inverter 41 and the second inverter 42 are cut off. In FIG. 3, a left S-axis represents rotational speed of the sun gear of the planetary gear set 30 that is the rotational speed Nm1 of the first motor MG1, a C-axis represents rotational speed of the carrier of the planetary gear set 30 that is the rotational speed Ne of the engine 22, and an R-axis represents rotational speed of the ring gear of the planetary gear set 30 that is the rotational speed Nm2 of the second motor MG2 (and a rotational speed Nd of the driving shaft 36). In FIG. 3, a value "ρ" represents a gear ratio (the number of teeth of the sun gear/the number of teeth of the ring gear) of the planetary gear set 30. As illustrated in FIG. 3, when the first motor MG1 rotates, drag torque (mechanical loss) Tdrg1 is generated in the first motor MG1. When the counter-electromotive voltage Vcef1 of the first motor MG1 is higher than the voltage VH of the high voltage-side electric power line 54a, the drag torque Tdrg1, as well as regeneration torque Tcef1 based on the counter-electromotive voltage Vcef1 are generated in the first motor MG1. Accordingly, when the counter-electromotive voltage Vcef1 of the first motor MG1 is higher than the voltage VH of the high voltage-side electric power line 54a, counterforce torque (−(Tdrg1+Tcef1)/ρ) of the regeneration torque Tcef1 and the drag torque Tdrg1 of the first motor MG1 is output to the driving shaft 36 as driving torque (torque for forward travel). An absolute value of the drag torque Tdrg1 of the first motor MG1 becomes larger as an absolute value of the rotational speed Nm1 of the first motor MG1 is larger. More specifically, the regeneration torque Tcef1 of the first motor MG1 is generated as the first motor MG1 is rotated with operation of the engine 22, and the electric power based on the counter-electromotive voltage Vcef1 of the first motor MG1 is rectified by the diode D11 to D16 of the first inverter 41 and is supplied to the battery 50 through the high voltage-side electric power line 54a, the step up-down converter 55, and the low voltage-side electric power line 54b. Although not illustrated in FIG. 3, drag torque Tdrg2 is generated in the second motor MG2 and is output to the driving shaft 36 as braking torque when the second motor MG2 rotates. When the counter-electromotive voltage Vcef2 of the second motor MG2 is higher than the voltage VH of the high voltage-side electric power line 54a, not only the drag torque Tdrg2 but also regeneration torque Tcef2 based on the counter-electromotive voltage Vcef2 are generated in the second motor MG2. The torque (Tdrg2+Tcef2) is output to the driving shaft 36 as braking torque. An absolute value of the drag torque Tdrg2 of the second motor MG2 becomes larger as an absolute value of the rotational speed Nm2 of the second motor MG2 is larger. The counter-electromotive voltage Vcef2 of the second motor MG2 corresponds to a product of an angular speed ωm2 and a counter-electromotive voltage constant Km2 of the second motor MG2. More specifically, the regeneration torque Tcef2 of the second motors MG2 is generated as the electric power based on the counter-electromotive voltage Vcef2 of the second motor MG2 is rectified by the diode D21 to D26 of the second inverter 42 and is supplied to the battery 50 through the high voltage-side electric power line 54a, the step up-down converter 55, and the low voltage-side electric power line 54b.

Once the target rotational speed Nm1* of the first motor MG1 is set in this way, a target rotational speed Ne* of the engine 22 is calculated by Expression (1) with use of the target rotational speed Nm1* of the first motor MG1, the rotational speed Nm2 of the second motor MG2 (rotational speed Nd of the driving shaft 36), and the gear ratio ρ of the planetary gear set 30. The calculated target rotational speed Ne* is transmitted to the engine ECU 24. Here, Expression (1) can easily be derived with reference to FIG. 3. When receiving the target rotational speed Ne* of the engine 22, the engine ECU 24 performs intake air amount control, fuel injection control, and ignition control of the engine 22 such that the rotational speed Ne of the engine 22 becomes the target rotational speed Ne*.

$$Ne^* = (Nm1^* \times \rho + Nm2)/(1+\rho) \tag{1}$$

Thus, the counter-electromotive voltage Vcef1 of the first motor MG1 is made higher than the voltage VH of the high voltage-side electric power line 54a when the accelerator is on. As a result, the hybrid vehicle 20 can travel with the driving torque of the driving shaft 36 based on the regeneration torque Tcef1 and the drag torque Tdrg1 of the first motor MG1. As the vehicle speed V (rotational speed Nm2 of the second motor MG2) is higher, the drag torque Tdrg2 of the second motor MG2 becomes larger. When the counter-electromotive voltage Vcef2 of the second motor MG2 is higher than the voltage VH of the high voltage-side electric power line 54a, the regeneration torque Tcef of the second motor MG2 is output to the driving shaft 36 as braking torque. Accordingly, as the vehicle speed V is higher, the total torque of the driving shaft 36 as the driving torque becomes smaller.

Figure 4:
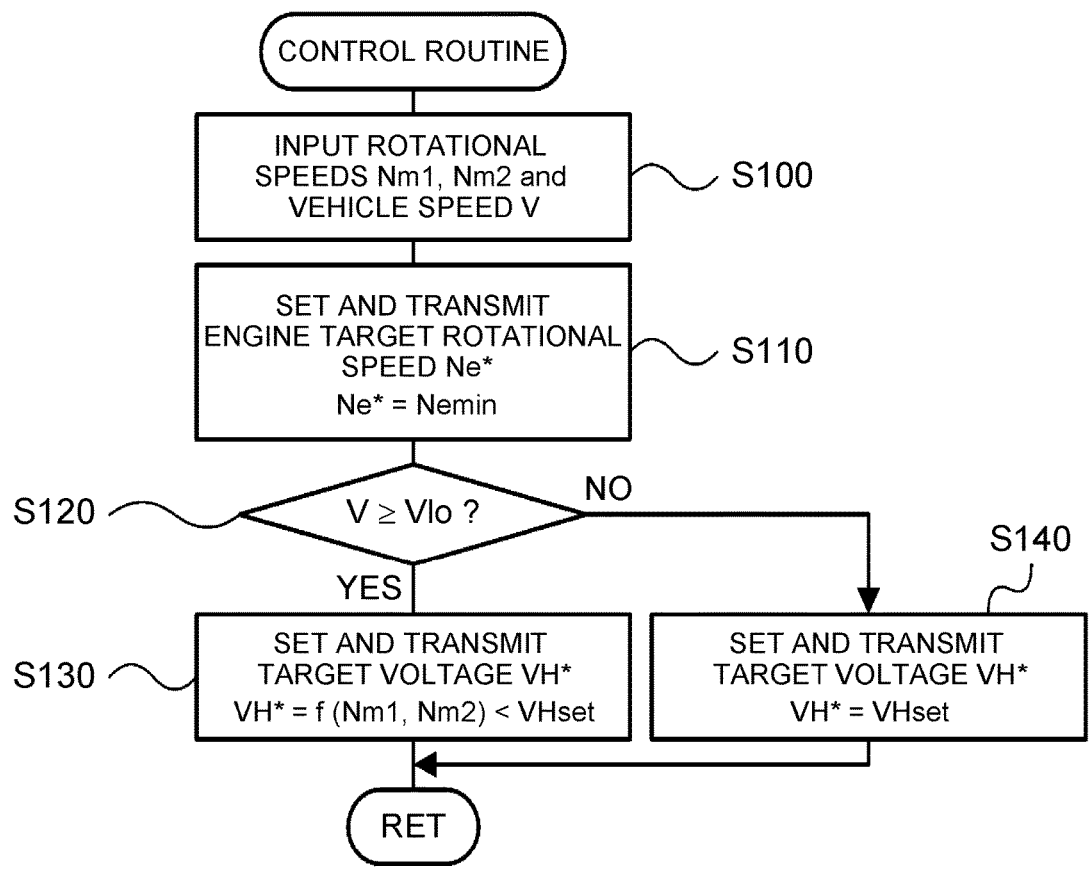
FIG. 4 is a flowchart illustrating one example of a control routine executed by a hybrid electronic control unit (HVECU) illustrated in FIG. 1.

A description is now given of the operation of the hybrid vehicle 20 of the embodiment configured in this way, and the operation at the time when the accelerator is off in inverter-less traveling in particular. FIG. 4 is a flowchart illustrating one example of a control routine executed by the HVECU 70 in the above case. The routine is repeatedly executed in inverter-less traveling when the accelerator is off.

When the control routine of FIG. 4 is executed, the HVECU 70 inputs data such as the vehicle speed V, the rotational speed Nm1 of the first motor MG1, and the rotational speed Nm2 of the second motor MG2 (step S100). Here, as the vehicle speed V, a value detected by the vehicle speed sensor 88 is input. As the rotational speeds Nm1, Nm2 of the first motor MG1 and the second motor MG2, values calculated based on the rotational positions of the rotators of the first motor MG1 and the second motor MG2 detected by the first rotational position detection sensor 43 and the second rotational position detection sensor 44 are input from the motor ECU 40 through communication, or values obtained by multiplying the vehicle speed V detected by the vehicle speed sensor 88 by conversion coefficients are input.

Figure 5:
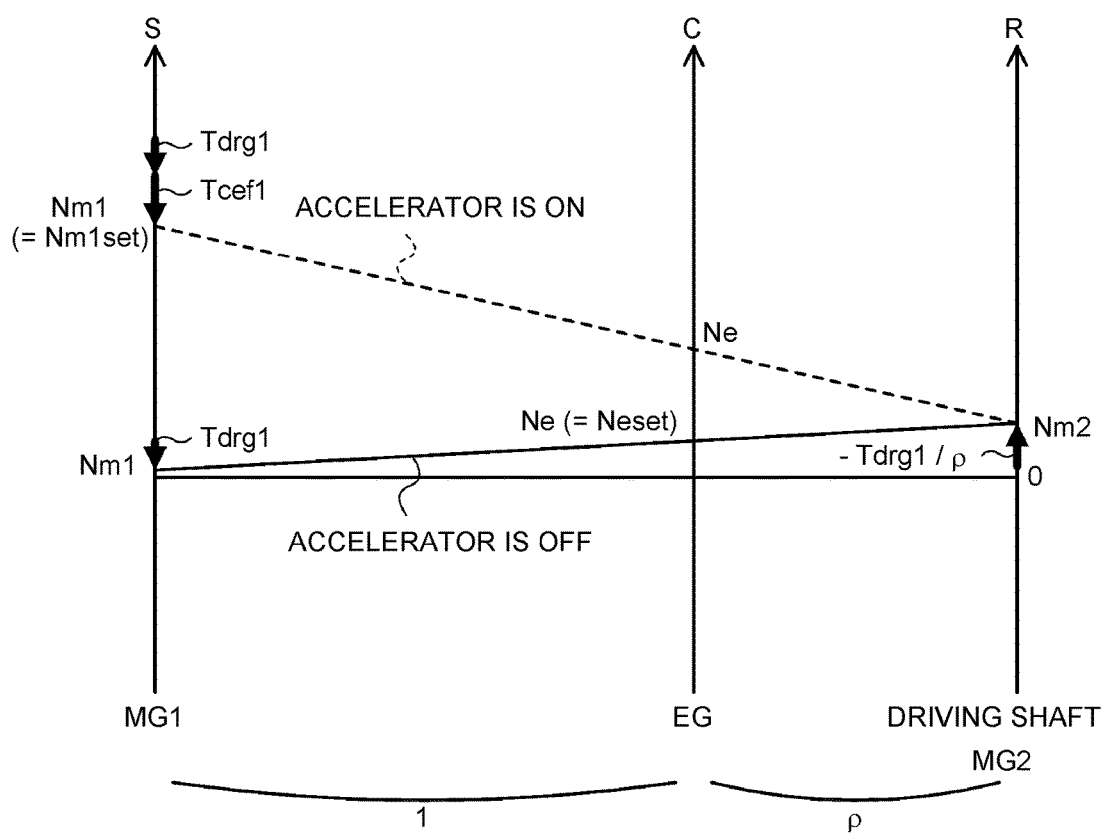
FIG. 5 is an explanatory view illustrating one example of an alignment chart of the planetary gear set in the hybrid vehicle of the embodiment when an accelerator is on or off in inverter-less traveling.
Figure 6:
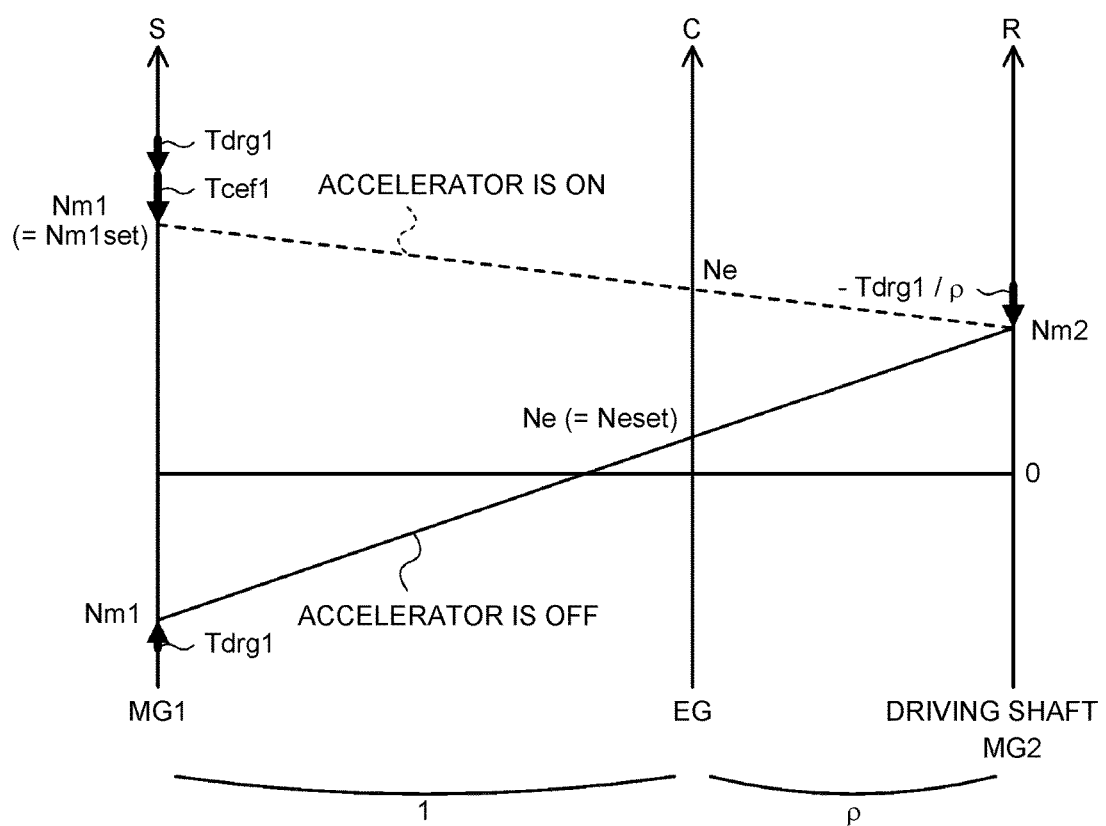
FIG. 6 is an explanatory view illustrating one example of an alignment chart of the planetary gear set in the hybrid vehicle of the embodiment when the accelerator is on or off in inverter-less traveling.

Once the data is input in this way, the HVECU 70 sets the target rotational speed Ne* of the engine 22 to an allowable lower limit rotational speed Nemin, and transmits the target rotational speed Ne* to the engine ECU 24 (step S110). Here, the allowable lower limit rotational speed Nemin of the engine 22 is a lower limit of a rotational speed range where self-sustained operation of the engine 22 is possible. As the allowable lower limit rotational speed Nemin, values such as 900 rpm, 1000 rpm, and 1100 rpm may be used for example. When receiving the target rotational speed Ne* of the engine 22, the engine ECU 24 controls the engine 22 such that the rotational speed Ne of the engine 22 becomes the target rotational speed Ne*. When the engine 22 is rotated at the allowable lower limit rotational speed Nemin in such a way, the rotational speed Nm1 of the first motor MG1 can be made sufficiently lower than the rotational speed (specified rotational speed Neset) when the accelerator is on. FIGS. 5 and 6 are explanatory views illustrating examples of alignment charts of the planetary gear set 30 when the accelerator is on or off in inverter-less traveling. FIG. 5 illustrates the case where the rotational speed Nm1 of the first motor MG1 is a rotational speed of positive rotation when the rotational speed Ne of the engine 22 is equal to the allowable lower limit rotational speed Nemin while the accelerator is off. FIG. 6 illustrates the case where the rotational speed Nm1 of the first motor MG1 is a rotational speed of negative rotation when the rotational speed Ne of the engine 22 is equal to the allowable lower limit rotational speed Nemin while the accelerator is off. In FIGS. 5 and 6, a dashed line represents the case where the accelerator is on, and a solid line represents the case where the accelerator is off. In FIGS. 5 and 6, a thick arrow line on the R-axis represents torque ($-Tcef1/\rho$) based on the drag torque Tcef1 of the first motor MG1 when the accelerator is off, the torque being output to the driving shaft 36. In FIGS. 5 and 6, the regeneration torque Tcef2 and the drag torque Tdrg2 of the second motor MG2 are not illustrated as in FIG. 3. In FIG. 5, when the accelerator is off, generation of the regeneration torque Tcef1 in the first motor MG1 can be prevented, and the drag torque Tdrg1 of the first motor MG1 can be reduced. Accordingly, the torque output from the first motor MG1 to the driving shaft 36 through the planetary gear set 30 can be reduced as driving torque. In FIG. 6, when the accelerator is off, generation of the regeneration torque Tcef1 in the first motor MG1 can be prevented, or regeneration torque Tcef1 having a direction opposite to the direction of the regeneration torque Tcef1 when the accelerator is on can be generated. It is also possible to generate the drag torque Tdrg1 of the first motor MG1 in a direction opposite to the direction of the drag torque Tdrg1 when the accelerator is on. Accordingly, the torque output from the first motor MG1 to the driving shaft 36 through the planetary gear set 30 can be made into braking torque.

Next, the HVECU 70 compares the vehicle speed V with a threshold Vlo (step S120). Here, the threshold Vlo is a threshold used for determining whether or not the hybrid vehicle is requested to secure a braking force large to a certain extent. For example, the threshold Vlo may take values such as 40 km/h, 50 km/h, and 60 km/h.

When the vehicle speed V is equal to or above the threshold Vlo at step S120, the HVECU 70 determines that the hybrid vehicle is requested to secure the braking force large to a certain extent. Accordingly, the HVECU 70 sets the target voltage VH* of the high voltage-side electric power line 54a to a voltage lower than the specified voltage VHset, transmits the target voltage VH* to the motor ECU 40 (step S130), and ends the present routine. When receiving the target voltage VH* of the high voltage-side electric power line 54a, the motor ECU 40 controls the step up-down converter 55 such that the voltage VH of the high voltage-side electric power line 54a becomes the target voltage VH*.

Assume the case where the rotational speed Nm1 of the first motor MG1 is sufficiently lowered, so that the torque applied from the first motor MG1 to the driving shaft 36 through the planetary gear set 30 becomes sufficiently small as driving torque or becomes braking torque. In this case, the voltage VH of the high voltage-side electric power line 54a is made lower than the voltage (specified voltage VHset) obtained when the accelerator is on, so that the regeneration torque Tcef2 of the second motor MG2 can be generated and increased. As a consequence, as compared with the case where the rotational speed Nm1 of the first motor MG1 is simply lowered, the total torque of the driving shaft 36 (a sum of the torque output from the first motor MG1 to the driving shaft 36 through the planetary gear set 30 and the torque output from the second motor MG2 to the driving shaft 36) can sufficiently be reduced (can sufficiently be increased as braking torque). As a result, a sufficient braking force of the hybrid vehicle can be secured. In the embodiment, the target voltage VH* of the high voltage-side electric power line 54a is set as the target voltage VH* of the high voltage-side electric power line 54a so that the total torque of the driving shaft 36 is minimized (maximized as braking torque). Specifically, a relation between the rotational speeds Nm1, Nm2 of the first motor MG1 and the second motor MG2 and the target voltage VH* of the high voltage-side electric power line 54a that minimizes the total torque of the driving shaft 36 is preset by an experiment or analysis and is stored as a map in an unillustrated ROM. When the rotational speeds Nm1, Nm2 of the first motor MG1 and the second motor MG2 are given, a corresponding target voltage VH* of the high voltage-side electric power line 54a is derived from the map and set. When the target voltage VH* of the high voltage-side electric power line 54a is set in this way, the torque of the driving shaft 36 can be maximized as braking torque. As a result, a more sufficient braking force of the hybrid vehicle can be secured.

When the vehicle speed V is less than the threshold Vlo at step S120, the HVECU 70 determines that the hybrid vehicle is not requested to secure the braking force large to a certain extent. Accordingly, the HVECU 70 sets the target voltage VH* of the high voltage-side electric power line 54a to the specified voltage VHset, transmits the target voltage VH* to the motor ECU 40 (step S140), and ends the present routine. Therefore, output of a relatively large braking force to the hybrid vehicle at a relatively low vehicle speed can be suppressed.

In the hybrid vehicle 20 of the embodiment described in the foregoing, when the accelerator is on in inverter-less traveling, the engine 22 and the step up-down converter 55 are controlled such that the counter-electromotive voltage Vcef1 of the first motor MG1 becomes higher than the voltage VH of the high voltage-side electric power line 54a and that the driving torque based on the regeneration torque Tcef1 and the drag torque Tdrg1 of the first motor MG1 is output to the driving shaft 36. When the accelerator is off in inverter-less traveling, the rotational speed Nm1 of the first motor MG1 is made smaller and the voltage VH of the high voltage-side electric power line 54a is made lower than those when the accelerator is on. As a result, as compared with the case where the rotational speed Nm1 of the first motor MG1 is simply reduced, the total torque of the driving shaft 36 can sufficiently be reduced (can sufficiently be increased as braking torque). As a result, a sufficient braking force of the hybrid vehicle can be secured. In addition, the target voltage VH* of the high voltage-side electric power line 54a is set such that the total torque of the driving shaft 36 is minimized (maximized as braking torque). This makes it possible to maximize the torque of the driving shaft 36 as braking torque. As a result, a more sufficient braking force of the hybrid vehicle can be secured.

Figure 7:
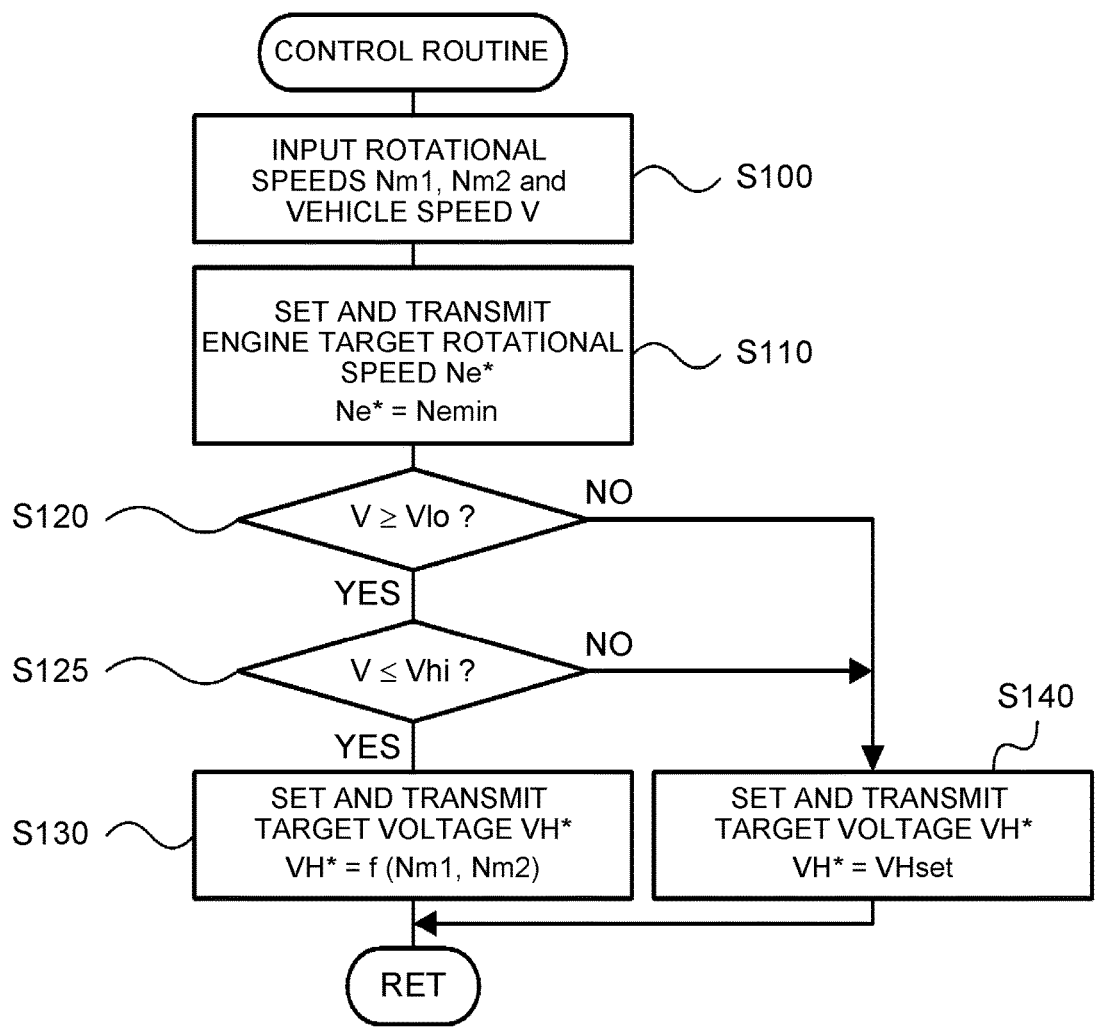
FIG. 7 is a flowchart illustrating one example of a control routine in a modification of the hybrid vehicle of the embodiment of the present disclosure.

In the hybrid vehicle 20 of embodiment, the target voltage VH* of the high voltage-side electric power line 54a is set in accordance with a size relation between the vehicle speed V and the threshold Vlo when the accelerator is off in inverter-less traveling. However, the target voltage VH* of the high voltage-side electric power line 54a may be set also in accordance with a size relation between the vehicle speed V and a threshold Vhi that is larger than the threshold Vlo in addition to the size relation between the vehicle speed V and the threshold Vlo. One example of a control routine in this case is illustrated in FIG. 7. The control routine of FIG. 7 is similar to the control routine of FIG. 4 except for the point that processing of step S125 is added. Therefore, like processing is designated by like step number, and a detailed description thereof is omitted.

In the control routine of FIG. 7, the HVECU 70 compares the vehicle speed V with a threshold Vhi when the vehicle speed V is equal to or above the threshold Vlo at step S120 (step S125). When the vehicle speed V is equal to or below the threshold Vhi, the HVECU 70 sets the target voltage VH* of the high voltage-side electric power line 54a to a voltage lower than the specified voltage VHset, transmits the target voltage VH* to the motor ECU 40 (step S130), and ends the present routine. When the vehicle speed V is higher than the threshold Vhi, the HVECU 70 sets the target voltage VH* of the high voltage-side electric power line 54a to the specified voltage VHset, transmits the target voltage VH* to the motor ECU 40 (step S140), and ends the present routine.

Here, the threshold Vhi is a threshold used for determining whether or not a large current may possibly flow into the second inverter 42, the step up-down converter 55, and the battery 50 when the voltage VH of the high voltage-side electric power line 54a is made lower than the voltage (specified voltage VHset) when the accelerator is on. For example, values such as 80 km/h, 90 km/h, and 100 km/h may be used as the threshold Vhi. When the voltage VH of the high voltage-side electric power line 54a is lowered, a value (Vcef2−VH) obtained by subtracting the voltage VH of the high voltage-side electric power line 54a from the counter-electromotive voltage Vcef2 of the second motor MG2 increases. Accordingly, the electric current flowing into the second inverter 42, the step up-down converter 55, and the battery 50 increases. Such electric current increases since the counter-electromotive voltage Vcef2 of the second motor MG2 becomes larger as the vehicle speed V is higher. In consideration of protecting the second inverter 42, the step up-down converter 55, and the battery 50, it is preferable to suppress a large current flowing therein. In the modification, when the vehicle speed V is equal to or above the threshold Vlo, the voltage VH of the high voltage-side electric power line 54a is not lowered from the voltage obtained when the accelerator is on. Accordingly, the second inverter 42, the step up-down converter 55, and the battery 50 can more sufficiently be protected.

When the vehicle speed V is equal to or above the threshold Vlo when the accelerator is off in inverter-less traveling, the hybrid vehicle 20 of embodiment makes the voltage VH of the high voltage-side electric power line 54a lower than the voltage VH when the accelerator is on. When the vehicle speed V is less than the threshold Vlo, the voltage VH of the high voltage-side electric power line 54a is made identical to the voltage VH when the accelerator is on. However, irrespective of the size relation between the vehicle speed V and the threshold Vlo, the voltage VH of the high voltage-side electric power line 54a may be made lower than the voltage VH when the accelerator is on.

In the hybrid vehicle 20 of the embodiment, when the vehicle speed V is equal to or above the threshold Vlo when the accelerator is off in inverter-less traveling, the target voltage VH* of the high voltage-side electric power line 54a is set such that the total torque of the driving shaft 36 is minimized (is maximized as braking torque). However, when the target voltage VH* of the high voltage-side electric power line 54a is set within limits lower than the voltage (specified voltage VHset) obtained when the accelerator is on, the total torque of the driving shaft 36 may not be minimized. In that case, irrespective of the rotational speeds Nm1, Nm2 of the first motor MG1 and the second motor MG2, the target voltage VH* of the high voltage-side electric power line 54a may be set to a voltage lower by tens of voltages than the specified voltage VHset or to the voltage Vb of the battery 50.

In the hybrid vehicle 20 of the embodiment, the target rotational speed Ne* of the engine 22 is set to the allowable lower limit rotational speed Nemin when the accelerator is off in inverter-less traveling. However, the target rotational speed Ne* of the engine 22 may be set to rotational speeds slightly larger than the allowable lower limit rotational speed Nemin, such as 200 rpm, 300 rpm, and 400 rpm.

In the hybrid vehicle 20 of the embodiment, when the accelerator is on in inverter-less traveling, the target voltage VH* of the high voltage-side electric power line 54a is set to the specified voltage VHset, and the target rotational speed Nm1* of the first motor MG1 is set to the specified Nm1 set. However, the target rotational speed Nm1* of the first motor MG1 and the target voltage VH* of the high voltage-side electric power line 54a may be set such that absolute values of the regeneration torque Tcef1 and the drag torque Tdrg1 of the first motor MG1 and by extension an absolute value of the driving torque of the driving shaft 36 increase more as the accelerator operation amount Acc is larger. For example, it is considered to set the target rotational speed Nm1* of the first motor MG1 to a value that tends to become larger as the accelerator operation amount Acc is larger.

Although the hybrid vehicle 20 of the embodiment uses the battery 50 as an electric storage device, any device, such as a capacitor, may be used as long as the device can store electric power.

Although the hybrid vehicle 20 of the embodiment includes the engine ECU 24, the motor ECU 40, the battery ECU 52, and the HVECU 70, at least two of the ECUs may be configured as a single electronic control unit.

A description is given of a correspondence relation between main elements of the embodiment and main elements of the present disclosure described in SUMMARY. In the embodiment, the engine 22 is one example of "engine." The first motor MG1 corresponds to "first motor", and the planetary gear set 30 is one example of "planetary gear set." The second motor MG2 is one example of "second motor." The first inverter 41 is one example of "first inverter." The second inverter 42 is one example of "second inverter." The battery 50 is one example of "electric storage device." The step up-down converter 55 is one example of "step up-down converter." The HVECU 70, the engine ECU 24, and the motor ECU 40 are examples of "electronic control units."

Since the correspondence relation between the main elements of the embodiments and the main elements of the present disclosure described in SUMMARY is one example to provide a specific description of the modes for carrying out the present disclosure described in SUMMARY, the correspondence relation is not intended to limit the elements of the disclosure described in SUMMARY. More specifically, the disclosure disclosed in SUMMARY should be interpreted based on the description therein, and the embodiments are merely specific examples of the disclosure disclosed in SUMMARY.

Although the modes for carrying out the present disclosure have been described using the embodiments, the present disclosure is not limited in any manner to the embodiments disclosed. It should naturally be understood that the present disclosure can be carried out in various modes without departing from the scope of the present disclosure.

The present disclosure is applicable in the fields such as manufacturing of the hybrid vehicle.

What is claimed is:

1. A hybrid vehicle, comprising:
an engine;
a first motor configured to generate a counter-electromotive voltage with rotation of the first motor;
a second motor connected to a driving shaft coupled with driving wheels of the hybrid vehicle, the second motor being configured to generate a counter-electromotive voltage with rotation of the second motor;
a planetary gear set including three rotation elements connected to three shafts, the shafts including a shaft of the first motor, a shaft of the engine, and the driving shaft, the three rotation elements being connected such that the first motor, the engine, and the driving shaft are arrayed in the order of the first motor, the engine, and the driving shaft in an alignment chart;
a first inverter configured to drive the first motor;
a second inverter configured to drive the second motor;
an electric storage device;
a step up-down converter connected to a low voltage-side electric power line and a high voltage-side electric power line, the low voltage-side electric power line being connected to the electric storage device, the high voltage-side electric power line being connected to the first inverter and the second inverter, the step up-down converter being configured to transfer electric power between the low voltage-side electric power line and the high voltage-side electric power line while changing voltage of the electric power; and
an electronic control unit configured to:
(i) control the engine and the step up-down converter such that the counter-electromotive voltage of the first motor becomes higher than a direct current-side voltage of the first inverter and a direct current-side voltage of the second inverter and that torque is output from the first motor to the driving shaft through the planetary gear set, when an accelerator is on during specified traveling of the hybrid vehicle with gates of the first inverter and the second inverter being cut off and the engine being operated, and
(ii) control the engine and the step up-down converter such that rotational speed of the first motor becomes smaller and voltage of the high voltage-side electric power line becomes lower when the accelerator is off than when the accelerator is on during the specified traveling.

2. The hybrid vehicle according to claim 1, wherein the electronic control unit is configured to:
(i) set a target voltage of the high voltage-side electric power line such that a total torque of the driving shaft is maximized as braking torque when the accelerator is off during the specified traveling, and
(ii) control the step up-down converter such that the voltage of the high voltage-side electric power line becomes the target voltage.

3. The hybrid vehicle according to claim 1, wherein the electronic control unit is configured to:
(i) control the step up-down converter such that the voltage of the high voltage-side electric power line becomes lower than the voltage when the accelerator is on, when the accelerator is off during the specified traveling and when vehicle speed is in a specified range, and
(ii) control the step up-down converter such that the voltage of the high voltage-side electric power line becomes identical to the voltage when the accelerator is on, when the vehicle speed is out of the specified range.

4. The hybrid vehicle according to claim 3, wherein the specified range of the vehicle speed has a lower limit that is a threshold used for determining whether or not the hybrid vehicle is required to secure a braking force of a specified magnitude.

5. The hybrid vehicle according to claim 3, wherein the specified range of the vehicle speed has an upper limit that is a threshold used for determining whether or not electric current of a specified value or more possibly flow to the second inverter, the step up-down converter, and the electric storage device, when the voltage of the high voltage-side electric power line is made lower than the voltage when the accelerator is on.

6. The hybrid vehicle according to claim 1, wherein the electronic control unit is configured to control the engine such that the engine rotates at an allowable lower limit rotational speed, when the accelerator is off during the specified traveling.

7. A control method for a hybrid vehicle, the hybrid vehicle including: an engine, a first motor configured to generate a counter-electromotive voltage with rotation of the first motor; a second motor connected to a driving shaft coupled with driving wheels of the hybrid vehicle, the second motor being configured to generate a counter-electromotive voltage with rotation of the second motor; a planetary gear set including three rotation elements connected to three shafts, the shafts including a shaft of the first motor, a shaft of the engine, and the driving shaft, the three rotation elements being connected such that the first motor, the engine, and the driving shaft are arrayed in the order of the first motor (MG1), the engine, and the driving shaft in an alignment chart; a first inverter configured to drive the first motor; a second inverter configured to drive the second motor; an electric storage device; and a step up-down converter connected to a low voltage-side electric power line and a high voltage-side electric power line, the low voltage-side electric power line being connected to the electric storage device, the high voltage-side electric power line being connected to the first inverter and the second inverter, the step up-down converter being configured to transfer electric power between the low voltage-side electric power line and the high voltage-side electric power line while changing voltage of the electric power, the control method comprising:

(i) controlling the engine and the step up-down converter such that the counter-electromotive voltage of the first motor becomes higher than a direct current-side voltage of the first inverter and a direct current-side voltage of the second inverter and that torque is output from the first motor to the driving shaft through the planetary gear set, when an accelerator is on during specified traveling of the hybrid vehicle with gates of the first inverter and the second inverter being cut off and the engine being operated, and (ii) controlling the engine and the step up-down converter such that rotational speed of the first motor becomes smaller and voltage of the high voltage-side electric power line becomes lower when the accelerator is off than when the accelerator is on during the specified traveling.

* * * * *